(12) United States Patent
Kim

(10) Patent No.: US 8,199,020 B1
(45) Date of Patent: *Jun. 12, 2012

(54) THERMAL CUTOFF FUSE FOR ARBITRARY TEMPERATURES

(75) Inventor: Yoonkee Kim, Freehold, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 258 days.

This patent is subject to a terminal disclaimer.

(21) Appl. No.: 12/079,085

(22) Filed: Feb. 11, 2008

(51) Int. Cl.
*G01W 1/00* (2006.01)

(52) U.S. Cl. ..... 340/601; 340/500; 340/540; 340/572.1; 340/584; 310/307; 310/332

(58) Field of Classification Search ............... 340/500, 340/540, 572.1–572.9, 584–585; 235/375–385
See application file for complete search history.

(56) References Cited

U.S. PATENT DOCUMENTS

| | | | | |
|---|---|---|---|---|
| 5,909,078 | A | 6/1999 | Wood et al. | 310/307 |
| 6,114,794 | A | 9/2000 | Dhuler et al. | 310/307 |
| 6,531,947 | B1 * | 3/2003 | Weaver et al. | 337/139 |
| 6,876,482 | B2 * | 4/2005 | DeReus | 359/290 |
| 7,075,413 | B2 * | 7/2006 | Friedman | 340/10.4 |
| 7,239,064 | B1 | 7/2007 | Jenkins et al. | 310/307 |
| 7,495,368 | B2 * | 2/2009 | Gogoi et al. | 310/300 |
| 7,619,346 | B2 | 11/2009 | Yazdi | 310/307 |
| 7,680,691 | B2 | 3/2010 | Kimball et al. | |
| 2003/0095034 | A1 * | 5/2003 | Clothier | 340/10.1 |
| 2005/0009197 | A1 | 1/2005 | Adams et al. | 436/164 |
| 2006/0187031 | A1 | 8/2006 | Moretti et al. | |
| 2007/0024410 | A1 * | 2/2007 | Yazdi | 338/13 |
| 2007/0194656 | A1 * | 8/2007 | Takayanagi et al. | 310/307 |

* cited by examiner

*Primary Examiner* — Brian Zimmerman
*Assistant Examiner* — James Yang
(74) *Attorney, Agent, or Firm* — Michael Zelenka; Stephen J. Harbulak

(57) ABSTRACT

A temperature-sensitive thermal cutoff fuse RFID tag is provided with a bimorph element and thin conductive bridges positioned on an RFID tag substrate that can react to all changes in storage temperature conditions. The bimorph element is configured and positioned so that when it bends in response to one or more predetermined temperatures, the bimorph element will break one of the conductive bridges and cause an open circuit that can be detected when the RFID tag is interrogated by a sensor. The temperature-sensitive thermal cutoff fuse RFID tag can provide high and low temperature information about numerous stored objects such as food, medicine, chemicals, batteries, explosives and munitions. Multiple temperature conductive bridge cutoff fuse RFID tag arrangements and methods for notifying the user when a required storage temperature has been reached with a passive temperature-sensitive thermal cutoff fuse RFID tag.

20 Claims, 3 Drawing Sheets

US 8,199,020 B1

THERMAL CUTOFF FUSE FOR ARBITRARY TEMPERATURES

GOVERNMENT INTEREST

The invention described herein may be manufactured, used, imported, sold, and licensed by or for the Government of the United States of America without the payment to me of any royalty thereon.

RELATED APPLICATION

U.S. Ser. No. 12/154,815, entitled "Cutoff Fuse Triggered By Excessive Humidity," was filed with the U.S. Patent And Trademark Office on May 13, 2008, has been assigned to the same assignee and is related to this application.

FIELD OF THE INVENTION

The present invention relates to radio frequency identification devices. More particularly, the present invention relates to radio frequency identification devices with a thermal cutoff fuse for excessive temperatures.

BACKGROUND OF THE INVENTION

Radio Frequency Identification (RFID) is an emerging area of technology with numerous applications, particularly in the field of inventory control. RFID is an automatic identification method, relying on storing and remotely retrieving data using devices that are called RFID tags or transponders. An RFID tag is a small object that can be attached to, or incorporated into, a product, animal, person or other stored object and contains silicon chips and antennas to enable it to receive and respond to radio-frequency queries from an RFID transceiver. When an RFID tag is combined with one or more sensors, the RFID tag can report the information that is measured by the sensors. A passive RFID tag requires no internal power source, while active RFID tags do require a power source. A passive RFID tag is better for inventory control for long-term storage items because the use of battery power to operate the RFID tag is ordinarily unacceptable. For such applications, a passive RFID tag combined with a sensor that also does not need power for its operation is critical.

RFID tags have found numerous useful applications in the storage of a diverse number of commodities, but they still suffer from the drawbacks, limitations and shortcomings of being temperature-insensitive because they do not identify excessively high or low temperatures. During storage, if the proper temperature range is not maintained, the useful lifetime, capability, safety, and many other characteristics of the stored object can be deleteriously degraded or lost, which can lead to a number of undesirable, and possibly dangerous, results. Currently available RFID tags do not promptly identify undesirable conditions where an excessively high or low storage temperature can harm the stored object.

Thermal fuses have been used to monitor excessively high temperatures with a certain amount of success. A thermal fuse is defined as a cutoff device which uses a one-time fusible link. While a thermostat automatically resets itself whenever the temperature drops, the thermal fuse is more like an electrical fuse: a single-use device that cannot be reset and must be replaced when it fails or is triggered. Conventional thermal fuses cut off only at a high temperature, and not at temperatures that are lower than room temperature. Thus, there has been a long-felt need for a thermal fuse that operates at lower temperatures, as well as high temperatures that inform the user that the required storage temperatures have been exceeded that does not suffer from the disadvantages, shortcomings and limitations of prior art temperature-insensitive RFID tags and high temperature only thermal cutoff fuses. Up until now, the long-felt need for an all temperature-sensitive RFID tag has not been met.

SUMMARY OF THE INVENTION

In order to answer the long-felt need for an all-temperature-sensitive RFID tag, the present invention provides an RFID tag with a thermal cutoff fuse that causes a detectable open circuit when a required storage temperature has not been maintained. The present invention provides a high and low temperature thermal cutoff fuse advantageously positioned on an RFID tag that cuts off at predetermined temperatures, either high or low, or both. In contrast, conventional thermal fuses cut off only at a high temperature and not at a temperature lower than room temperature. This invention's thermal cutoff fuse RFID tag advantageously configures a bimorph element and thin conductive bridges positioned on an RFID tag to react to storage temperature changes so that the bimorph element will bend and break one of the conductive bridges and cause an open circuit that can be detected by a sensor.

Accordingly, it is an object of the present invention to provide an all-temperature-sensitive RFID tag.

Another object of the present invention is to provide a passive all-temperature-sensitive RFID tag with a thermal cutoff fuse that notifies the user when required storage temperatures have not been maintained.

It is also an object of the present invention to provide a passive all-temperature-sensitive thermal cutoff fuse RFID tag comprising a bimorph element and thin conductive bridges that react to changes in storage temperature conditions that can be detected when the RFID tag is interrogated.

It is still a further object of this invention to provide a method of notifying the user when required high or low storage temperatures have been exceeded with a passive all-temperature sensitive RFID tag.

These and other objects and advantages can now be attained by this invention's temperature-sensitive thermal cutoff fuse RFID tag comprising a bimorph element and thin conductive bridges that can react to all changes in storage temperature conditions and cause an open circuit that can be detected when a sensor interrogates the RFID tag. A bimorph is a cantilever having two active layers that produce a displacement through thermal activation, which is a temperature change that causes one layer to expand more than the other layer. In accordance with the present invention, the bimorph element is configured and positioned so that when it bends in response to one or more predetermined temperatures, the bimorph element will break one of the conductive bridges and cause an open circuit that can be detected when the RFID tag is interrogated by a sensor. This invention's temperature-sensitive thermal cutoff fuse RFID tag could be advantageously used to provide high and low temperature information about numerous stored objects such as food, medicine, chemicals, and so on. The present invention also has numerous applications for military purposes as well, to provide temperature information for stored objects such as rations, medicines, and batteries, and most particularly for explosives and munitions, which can lose their effectiveness or become dangerous if exposed to any temperature exceeding a safe temperature range during storage. The present invention also encompasses different multiple temperature conductive bridge cutoff fuse RFID tag arrangements and methods for rapidly notifying the user when a predetermined storage temperature has been reached with a temperature sensitive RFID tag.

DETAILED DESCRIPTION OF THE DRAWINGS

Figure 1:
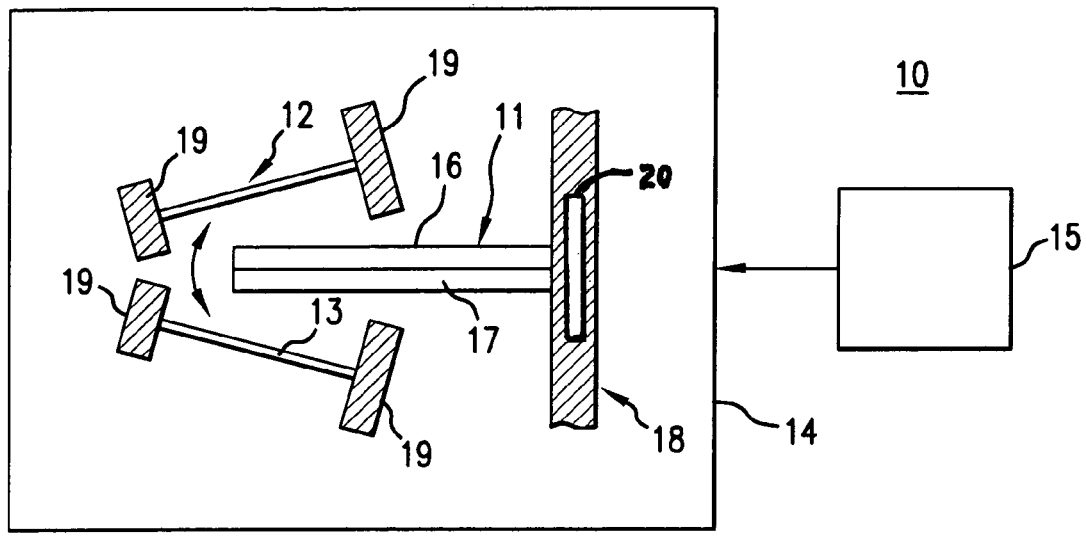
FIG. 1 is a top conceptual view of the temperature-sensitive thermal cutoff fuse RFID tag of the present invention.

The present invention is a passive temperature-sensitive thermal cutoff fuse RFID tag that reacts to all changes in storage temperature and can be interrogated by a sensor in the vicinity. Referring now to the drawings, FIG. 1 depicts a top conceptual view of this invention's temperature-sensitive thermal cutoff fuse RFID tag 10, comprising a bimorph strip 11 and thin conductive bridges 12 and 13 positioned on a tag substrate 14. The tag 10 is deployed in proximity to a stored object and a sensor 15.

The bimorph strip 11 further comprises two active layers 16 and 17 that produce a displacement through thermal activation, which is a temperature change that causes one layer to expand more than the other layer. This invention's bimorph strip 11 converts a storage temperature change into mechanical displacement because of the difference in the coefficients of thermal expansion of the two materials, such as a material with a small thermal expansion coefficient in layer 16 and a different material with a large thermal expansion coefficient in layer 17 so that a flat strip bends toward the layer 16 if heated, and in the opposite direction toward the layer 17 if cooled below its normal temperature. In operation, the bimorph strip 11 reacts to changes in storage temperature conditions and will cause a detectable open circuit. This invention's bimorph strip 11 is held in place on tag substrate 14 by a bimorph support arm 18. The thin conductive bridges 12 and 13 are constructed so that they can be broken easily by the bending the bimorph strip 11, but strong enough to withstand ordinary handling.

Each of the thin conductive bridges 12 and 13 are connected to a pair of flexible bridge support members 19 and a conductive bridge fuse circuit 20. In operation, the bimorph strip 11 is configured and positioned on the tag substrate 14 so that when it bends in response to a predetermined temperature it breaks one of the conductive bridges 12 and 13 to open the conductive bridge fuse circuit 20. Thus when RFID tag 10 is interrogated by sensor 15, the RFID tag 10 will indicate the shorted or open status of the conductive bridge fuse circuit 20.

Numerous variations of this invention's temperature-sensitive thermal cutoff fuse RFID tag 10 are possible, including thickness and configuration of the conductive bridges 12 and 13, composition of the bimorph strip 11 and the number of conductive bridges. The conductive bridges 12 and 13 can be as thin as a few tens of micrometers or otherwise comparable to the size of microelectronic circuits so long as they can be easily broken by the bimorph strip 11, survive normal handling shock and be manufactured with microelectronic fabrication techniques. Additionally, the bimorph strip 11 can be composed of numerous different materials, including metals, so long as the difference in the coefficients of thermal expansion between the two materials is adequate and the materials survive operational contraction and expansion.

Figure 2:
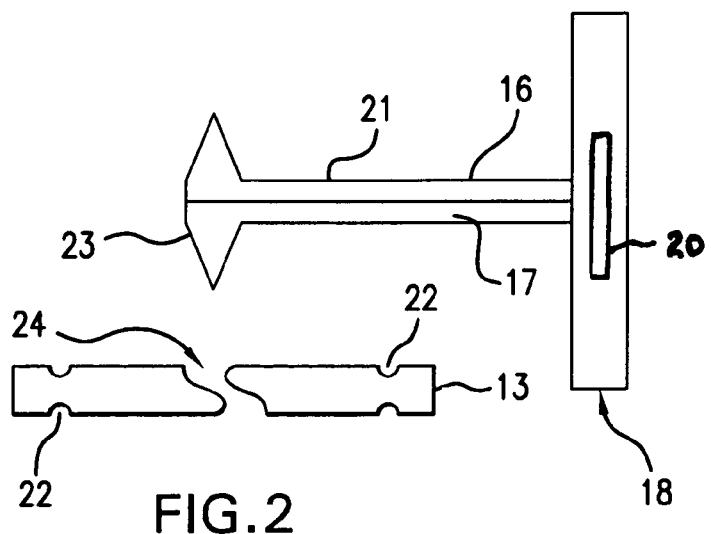
FIG. 2 is an enlarged side view of a modified bimorph strip and a notched conductive bridge in accordance with the present invention.

Referring now to FIG. 2 which uses the same numerals for like structural elements, there is depicted an enlarged side view of a modified bimorph element 21, conductive bridge 13 and bimorph support arm 18. In this case, the conductive bridge 13 has been configured with multiple notches 22 in order to provide easy breakage of the conductive bridge fuse circuit 20 in accordance with the present invention. The modified bimorph element 21 includes a sharpened edge 23 in order to more efficiently break the conductive bridge 13 and generate a breach 24 in the conductive bridge 13.

Although FIG. 1 illustrates at least two conductive bridges, the number of conductive bridges can be varied according to the number of desired temperature set points. Thus for certain applications, having even a single conductive bridge is as much within the contemplation of the present invention as having multiple conductive bridges. Whenever the stored object and storage facility require that the thermal fuse cut off at a single temperature set point, then only one conductive bridge is needed. The temperature-sensitive cutoff fuse RFID tag 10 depicted in FIG. 1 can be triggered at both high and low temperature set points, so that in most cases, two conductive bridges 12 and 13 will be effectively used.

The present invention also encompasses a number of different embodiments and configurations of the passive temperature-sensitive thermal cutoff fuse RFID tag. To have more set points, more conductive bridges can be added as shown FIG. 3. In accordance with the present invention, the fuse cutoff set point is decided by the distance between the conductive bridges and the bimorph strip 11. Suppose that the bimorph strip 11 bends toward the upper direction when the temperature increases. As temperature increases, the first conductive bridge 31 breaks, and if the temperature goes even higher, the next one 32 breaks. Thus, the RFID tag circuit can read the open circuit so that the excursion of the temperature during the storage can be read when the RFID tag is interrogated.

Figure 3:
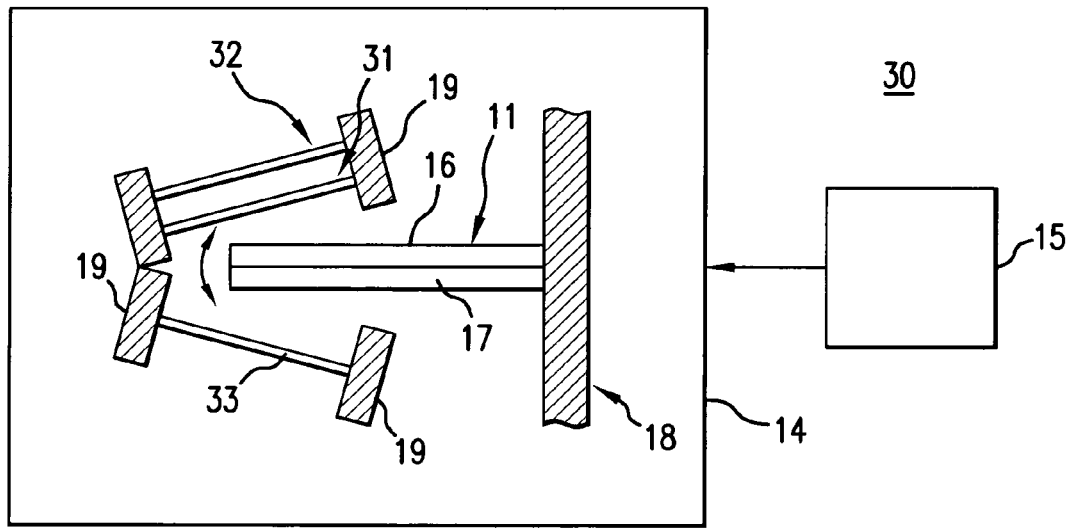
FIG. 3 is a top conceptual view of the temperature-sensitive thermal cutoff fuse RFID tag with multiple conductive bridges for multiple temperature settings.

Referring now to the drawings, and using the same numerals for like structural elements, FIG. 3 illustrates a top conceptual view of the multiple set-point temperature-sensitive thermal cutoff fuse RFID tag 30, comprising a bimorph strip 11, first top conductive bridge 31, second top conductive bridge 32, and lower conductive bridge 33. As is the case in all embodiments, the thin conductive bridges 31, 32 and 33 are constructed so that they can be broken easily by the bending of the bimorph strip 11 in response to predetermined changed storage temperatures, but strong enough to withstand ordinary handling. Each of the thin conductive bridges 31, 32 and 33 are connected to a pair of flexible bridge support members 19 and a conductive bridge fuse circuit 20, but for the sake of simplicity, the wiring for the circuit is not shown in this drawing and the remaining ones.

Another embodiment of the present invention is to fabricate the temperature-sensitive thermal cutoff fuse RFID tag at a very low cost with Micro-Electro-Mechanical Systems (MEMS) technology. MEMS technology permits the integration of mechanical elements, sensors, actuators, and electronics on a common silicon substrate through micro-fabrication techniques. The electronics are fabricated using integrated circuit (IC) process sequences, such as Complementary Metal-Oxide Semiconductor (CMOS) technique, and the micromechanical components are fabricated using compatible micromachining processes that selectively etch away parts of the silicon wafer or add new structural layers to form the mechanical and electromechanical devices. Those skilled in the art will readily appreciate that fabricating this invention's RFID tag devices with MEMS technology along with the RFID tag circuit at the same time, allows making the devices at a relatively low cost. This invention's conductive bridges can be easily made with a thin metal film deposited on a backing material such as poly-silicon, which is commonly used in MEMS fabrication process. And with MEMS technology, many bridges can be made without difficulty so that the range of the maximum temperature excursion can be recorded with a fine resolution of temperature. An MEMS temperature-sensitive thermal cutoff fuse RFID tag structure 40 showing the bimorph strip with only an upper bridge that is fabricated using MEMS technology is depicted in FIG. 4.

Figure 4:
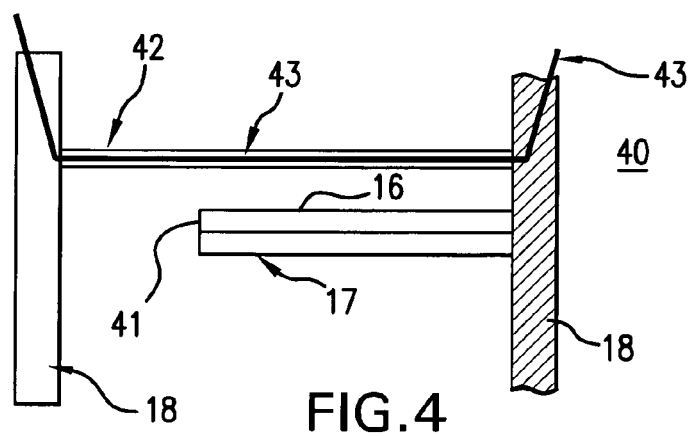
FIG. 4 is an enlarged front view of a bimorph strip and upper conductive bridge of the present invention.

Referring now to FIG. 4, there is depicted an enlarged side view of an MEMS temperature-sensitive thermal cutoff fuse RFID tag 40, comprising a bimorph strip 41, top layer 16, bottom layer 17, a conductive bridge 42, bimorph support arm 18, and a thin metal film 43 deposited on the conductive bridge 42 using MEMS technology. In this embodiment, the conductive bridge 42 may be composed of a backing material such as poly-silicon. This embodiment would also generally include multiple conductive bridges.

Figure 5:
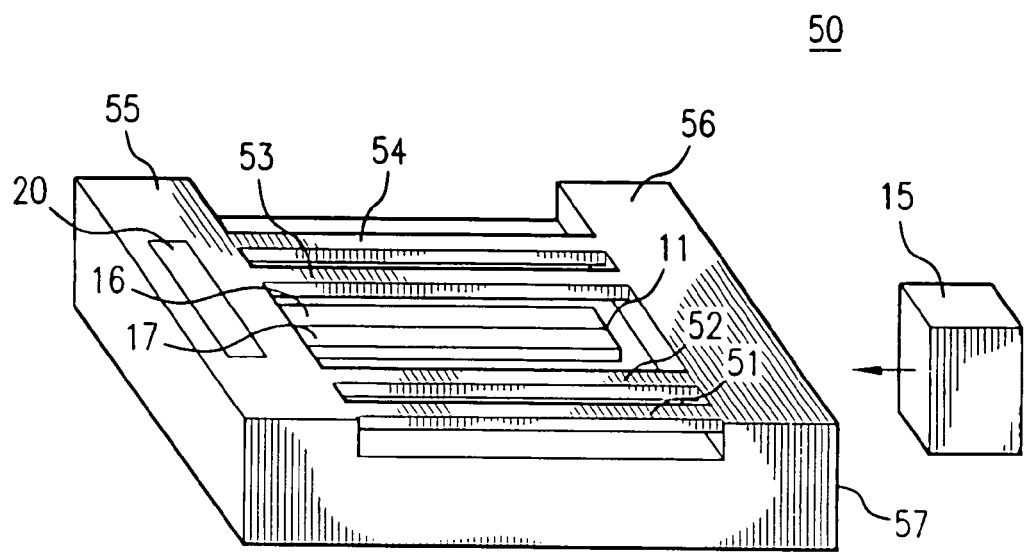
FIG. 5 is a perspective view of another embodiment of the temperature-sensitive thermal cutoff fuse RFID tag of the present invention with multiple conductive bridges.

Another embodiment of this invention's passive temperature-sensitive thermal cutoff fuse RFID tag is depicted in FIG. 5, where the temperature-sensitive thermal cutoff fuse RFID tag 50 is shown in a conceptual perspective view with multiple conductive bridge structures to provide a wider range of monitored temperatures. Referring now to FIG. 5, using the same numerals for like structural elements, there is depicted a perspective view of this invention's multiple bridge temperature-sensitive thermal cutoff fuse RFID tag 50, comprising a bimorph strip 11 and a plurality of thin conductive bridges 51, 52, 53 and 54 positioned on a tag substrate 57 that are held in place by bridge support arms 55 and 56.

This perspective view more clearly illustrates a portion of substrate 57 that has been etched away to allow for more freedom of movement for the bimorph strip 11. The tag 50 is deployed in proximity to a sensor 15. In operation, the bimorph strip 11 reacts to changes in storage temperature conditions and causes a detectable open circuit. This invention's bimorph strip 11 is held in place on tag substrate 57 by one of the bridge support arms 55. Each of the thin conductive bridges 51, 52, 53 and 54 are connected to a conductive bridge fuse circuit 20. In operation, the bimorph strip 11 is configured and positioned on the tag substrate 57 so that when the bimorph strip 11 bends in response to a predetermined temperature, the bimorph strip 11 breaks one of the conductive bridges 51, 52, 53 and 54 to open the conductive bridge fuse circuit 20. Thus when RFID tag 50 is interrogated by sensor 15, the RFID tag 50 will indicate the shorted or open status of the conductive bridge fuse circuit 20.

The present invention also contemplates a passive temperature-sensitive thermal cutoff fuse RFID tag system, comprising various embodiments of the RFID tag and sensor. Many of the variations of the RFID tag embodiments also apply to the RFID tag system embodiments.

The present invention also encompasses methods for notifying a user when predetermined temperatures for a group of stored objects have been reached with a passive temperature-sensitive thermal cutoff fuse RFID tag, comprising the steps of selecting a plurality of different materials that exhibit a difference in coefficients of thermal expansion; forming a bimorph strip with two layers composed of two different materials selected from the plurality of different materials because the difference in coefficients of thermal expansion causes the bimorph strip to bend in a first given direction when a first one of the layers is exposed to a first of a plurality of predetermined temperatures and in an opposite direction when a second one of the layers is exposed to a second of the plurality of predetermined temperatures; positioning the bimorph strip on a tag substrate; forming a group of thin conductive bridges on the tag substrate in proximity to the bimorph strip; configuring the thin conductive bridges to be broken by the bimorph strip bending after at least one of the plurality of predetermined temperatures has been reached; and connecting the thin conductive bridges to form a conductive bridge fuse circuit. The method continues with the steps of deploying the RFID tag among stored objects located in the vicinity of a sensor; breaking one of the thin conductive bridges with the bimorph strip when at least one of the plurality of predetermined temperatures is reached; causing the conductive bridge fuse circuit to become an open circuit detectable by the sensor; and interrogating the RFID tag with the sensor to detect the open circuit. Many of the variations of the RFID tag and tag system embodiments also apply to this invention's methods.

It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements, and dimensions can achieve the results described herein, without departing from the spirit and scope of this invention. Accordingly, the present invention should not be limited by the foregoing description, but only by the appended claims.

What I claim is:

1. A passive temperature-sensitive thermal cutoff fuse Radio Frequency Identification (RFID) tag requiring no internal power, comprising:
  a bimorph strip is constructed from two layers composed of two different materials;
  said bimorph strip is positioned on a tag substrate;
  a plurality of thin conductive bridges, being positioned on said tag substrate in proximity to and apart from said bimorph strip, are connected to form a one-time breakable nonresetable fusible link conductive bridge fuse circuit having no internal power and which is normally closed;
  each of said plurality of thin conductive bridges corresponding to a single temperature set point;
  said two different materials having a difference in coefficients of thermal expansion so that said bimorph strip bends in a first given direction when a first one of said layers is exposed to a first one of a plurality of predetermined set pointtemperatures and in an opposite direction when a second one of said layers is exposed to a second one of said plurality of predetermined set point temperatures;
  said plurality of thin conductive bridges being configured to be physically broken by said bimorph strip bending after at least one of said plurality of predetermined set point temperatures has been reached;
  said RFID tag being positioned among a plurality of stored objects that are located in the vicinity of a sensor; and
  said bimorph strip breaking one of said plurality of thin conductive bridges when said at least one of the plurality of predetermined set point temperatures is reached to cause said conductive bridge fuse circuit to become an open one-time broken nonresetable circuit detectable by said sensor.

2. The passive temperature-sensitive thermal cutoff fuse RFID tag, as recited in claim 1, further comprising said bimorph strip being held in place on said tag substrate by a bimorph support arm.

3. The passive temperature-sensitive thermal cutoff fuse RFID tag, as recited in claim 2, further comprising said plurality of thin conductive bridges being held in place by a pair of flexible bridge support members.

4. The passive temperature-sensitive thermal cutoff fuse RFID tag, as recited in claim 3, further comprising said plurality of predetermined temperatures including a temperature lower than room temperature.

5. The passive temperature-sensitive thermal cutoff fuse RFID tag, as recited in claim 3, further comprising said plurality of thin conductive bridges being at least two conductive bridges positioned to identify said plurality of predetermined temperatures.

6. The passive temperature-sensitive thermal cutoff fuse RFID tag, as recited in claim 5, wherein said two different materials are metals.

7. The passive temperature-sensitive thermal cutoff fuse RFID tag, as recited in claim 6, further comprising etching away a portion of said tag substrate to allow freer movement of said bimorph strip.

8. A passive temperature-sensitive thermal cutoff fuse Radio Frequency Identification (RFID) tag system, the tag requiring no internal power, comprising:
   a bimorph strip is constructed from two layers composed of two different materials;
   said bimorph strip is positioned on a tag substrate;
   a pair of thin conductive bridges, being positioned on said tag substrate in proximity to and apart from said bimorph strip, are connected to form a one-time breakable nonresetable fusible link conductive bridge fuse circuit having no internal power and which is normally closed;
   each of said plurality of thin conductive bridges corresponding to a single temperature set point;
   said two different materials having a difference in coefficients of thermal expansion so that said bimorph strip bends in a first given direction when a first one of said layers is exposed to a first one of a plurality of predetermined set point temperatures and in an opposite direction when a second one of said layers is exposed to a second one of said plurality of predetermined set point temperatures;
   said bimorph strip being held in place on said tag substrate by a bimorph support arm;
   said pair of thin conductive bridges being configured to be physically broken by said bimorph strip bending after at least one of said plurality of predetermined set point temperature has been reached;
   said RFID tag being positioned among a plurality of stored objects that are located in the vicinity of a sensor; and
   said bimorph strip breaking one of said pair of thin conductive bridges when said at least one of the plurality of predetermined set point temperatures is reached to cause said conductive bridge fuse circuit to become an open one-time broken nonresetable circuit detectable by said sensor.

9. The passive temperature-sensitive thermal cutoff fuse RFID tag system, as recited in claim 8, further comprising said plurality of predetermined temperatures including a temperature lower than room temperature.

10. The passive temperature-sensitive thermal cutoff fuse RFID tag system, as recited in claim 9, further comprising said pair of thin conductive bridges being held in place by a pair of flexible bridge support members.

11. The passive temperature-sensitive thermal cutoff fuse RFID tag system, as recited in claim 10, wherein said two different materials are metals.

12. The passive temperature-sensitive thermal cutoff fuse RFID tag system, as recited in claim 11, further comprising said RFID tag being constructed with Micro-Electro-Mechanical Systems (MEMS) technology.

13. The passive temperature-sensitive thermal cutoff fuse RFID tag, as recited in claim 12, further comprising etching away a portion of said tag substrate to allow freer movement of said bimorph strip.

14. A method for notifying a user when a plurality of predetermined temperatures for a plurality of stored objects have been reached with a passive temperature-sensitive thermal cutoff fuse RFID tag requiring no internal power, comprising the steps of:
   selecting a plurality of different materials that exhibit a difference in coefficients of thermal expansion;
   forming a bimorph strip with two layers composed of two different materials selected from said plurality of different materials, said difference in coefficients of thermal expansion causing said bimorph strip to bend in a first given direction when a first one of said layers is exposed to a first one of a plurality of predetermined temperatures and in an opposite direction when a second one of said layers is exposed to a second one of said plurality of predetermined temperatures;
   positioning said bimorph strip on a tag substrate;
   forming a plurality of thin conductive bridges on said tag substrate in proximity to and apart from said bimorph strip;
   each of said plurality of thin conductive bridges corresponding to a single temperature set point;
   configuring said plurality of thin conductive bridges to be physically broken by said bimorph strip bending after at least one of said plurality of predetermined set point temperatures has been reached;
   connecting said plurality of thin conductive bridges to form a one-time breakable nonresetable fusible link conductive bridge fuse circuit having no internal power and which is normally closed;
   deploying said RFID tag among said plurality of stored objects located in the vicinity of a sensor;
   breaking one of said plurality of thin conductive bridges with said bimorph strip when said at least one of the plurality of predetermined set point temperatures is reached;
   causing said conductive bridge fuse circuit to become an open one-time broken nonresetable circuit detectable by said sensor; and
   interrogating said RFID tag with said sensor to detect said open circuit.

15. The method for rapidly notifying a user when the plurality of predetermined temperatures has been reached with the passive temperature-sensitive thermal cutoff fuse RFID tag, as recited in claim 14, further comprising the step of holding said bimorph strip in place on said tag substrate by a bimorph support arm.

16. The method for rapidly notifying a user when the plurality of predetermined temperatures has been reached with the passive temperature-sensitive thermal cutoff fuse RFID tag, as recited in claim 15, further comprising the step of securing said plurality of thin conductive bridges with a pair of flexible bridge support members.

17. The method for rapidly notifying a user when the plurality of predetermined temperatures has been reached with the passive temperature-sensitive thermal cutoff fuse RFID tag, as recited in claim 16, wherein said plurality of predetermined temperatures includes a temperature lower than room temperature.

18. The method for rapidly notifying a user when the plurality of predetermined temperatures has been reached with the passive temperature-sensitive thermal cutoff fuse RFID tag, as recited in claim 14, further comprising the step of etching away a portion of said tag substrate to allow freer movement of said bimorph strip.

19. The method for rapidly notifying a user when the plurality of predetermined temperatures has been reached with the passive temperature-sensitive thermal cutoff fuse RFID tag, as recited in claim 18, further comprising the step of constructing said RFID tag with Micro-Electro-Mechanical Systems (MEMS) technology.

20. The method for rapidly notifying a user when the plurality of predetermined temperatures has been reached with the passive temperature-sensitive thermal cutoff fuse RFID tag, as recited in claim 14, wherein said two different materials are metals.

\* \* \* \* \*